United States Patent [19]

Omran et al.

[11] Patent Number: 4,921,543

[45] Date of Patent: May 1, 1990

[54] NOVEL LIQUIFIERS AND THEIR PREPARATION

[75] Inventors: Jafar Omran, Castrop-Rauxel; Arnold Alscher, Essen, both of Fed. Rep. of Germany

[73] Assignee: Rutgerswerke AG, Fed. Rep. of Germany

[21] Appl. No.: 236,511

[22] Filed: Aug. 24, 1988

[30] Foreign Application Priority Data

Sep. 11, 1987 [DE] Fed. Rep. of Germany ....... 3730532

[51] Int. Cl.[5] .............................................. C08G 16/00

[52] U.S. Cl. ...................................... 106/500; 562/41; 562/45; 252/353; 524/3; 524/877

[58] Field of Search .......................... 106/90, 94, 500; 562/41, 45; 252/353; 524/3, 877

[56] References Cited

U.S. PATENT DOCUMENTS

| | | | |
|---|---|---|---|
| 3,849,316 | 11/1974 | Motley et al. | 166/291 |
| 3,870,681 | 3/1975 | Falkahag et al. | 525/480 |
| 3,933,424 | 1/1976 | Falkahag et al. | 8/524 |
| 3,954,677 | 5/1976 | Law | 562/79 |
| 4,433,731 | 2/1984 | Chatterjie et al. | 166/293 |
| 4,443,358 | 4/1984 | Fry | 106/90 |
| 4,460,720 | 7/1984 | Gaidis et al. | 524/5 |
| 4,772,332 | 9/1988 | Nemeh et al. | 106/487 |

FOREIGN PATENT DOCUMENTS 383587 7/1987 Australia .

OTHER PUBLICATIONS

Chemical Abstracts 110(26):236340b; 110 (24):218069r; 108(6):43000r; 107(22):204039q; 107(22):200992q; 107(18):160351w; 107(16):139909z; 106(10):72016q; 103(22):182764c; 103(18):146271f; 100(26):214647y.

*Primary Examiner*—Brian E. Hearn
*Assistant Examiner*—Andrew Griffis
*Attorney, Agent, or Firm*—Bierman & Muserlian

[57] ABSTRACT

A process for the preparation of a liquifier for mineral binding agents comprising condensing a member of a group consisting of naphthalene sulfonic acid and alkyl naphthalene sulfonic acids with formaldehyde or a formaldehyde precursor in a highly acidic solution until a viscosity of 4,000 to 8,000 mPas is reached, adding water periodically to reduce the viscosity of the mixture until the condensation is complete and neutralizing the mixture to obtain a water-soluble condensation product and the liquifier produced thereby and mineral binding agents containing the same.

7 Claims, No Drawings

LIQUIFIERS AND THEIR PREPARATION

STATE OF THE ART

Mineral binding agents, among which are hydraulic binding agents such as cement, hydraulic lime, gypsum or anhydrite or binding agents which harden only in air such as lime, are brought into a workable state, that is kneadable, spreadable, pumpable or flowable form either alone or by being mixed with additives with water before their application at the construction site. In the process, the problem is generally encountered that in preparing a paste of these binding agents and additive materials, significantly more gauging water is necessary than is required in the subsequent chemical cross-linking reaction. This means that the excess water must evaporate after setting and the space occupied by it in the construction body remains as hollow space. These hollow spaces impair the mechanical strength of the construction body of a great measure and this is particularly of great technical significance in concrete buildings.

Therefore, small quantities of liquifiers are added to the water/binding agent mixture to obtain a reduction of the water fraction without increasing the water quantity with the flowability remaining the same which is of great significance, for example, in flow-coating. Particularly favorable results regarding the liquifying effect, the stability of the mixtures before and during the setting process, and the low dependence of the setting response before apportioning of the liquifiers is shown by binding agents from water-soluble condensation products of sulfonated naphthalene or alkyl-naphthalene with formaldehyde such as are known from, for example DE-AS 1,238,831 or DEP 2,007,603.

In these publications, methods for the manufacture of the condensates are disclosed wherein naphthalene is sulfonated with concentrated sulfuric acid to form an acidic sulfonate solution to which the appropriate quantity of formalin is added at 80° C. over a period of 3 hours. Then, the reaction mixture is heated to 95° to 100° C., maintained at this temperature for 25 hours and subsequently diluted with water and neutralized with an alkaline solution to obtain an approximately 35% solution of an alkaline salt of the resultant condensation product which is used as concrete liquifier possibly with additional additives such as perhaps gluconate. Inspite of the good degree of effectiveness of these agents, the need remains for concrete liquifiers whose effectiveness is improved with respect to liquifaction and improved pressure and bending strengths of the concrete while maintaining the same level of economy.

OBJECTS OF THE INVENTION

It is an object of the invention to provide a novel process for the preparation of an improved liquifier for mineral binding agents.

It is another object of the invention to provide novel liquifiers and the improved concretes containing the same.

These and other objects and advantages of the invention will become obvious from the following detailed description.

THE INVENTION

The novel process of the invention for the preparation of a liquifier for mineral binding agents comprises condensing a member of the group consisting of naphthalene sulfonic acid and alkyl naphthalene sulfonic acids with formaldehyde or a formaldehyde precursor in highly acidic solution until a viscosity of 4,000 to 8,000 mPas is reached, adding water periodically to reduce the viscosity of the mixture until the condensation is complete and neutralizing the mixture to obtain a water-soluble condensation product.

The simple modification of the condensation process significantly improves the properties of these liquifiers. This modification consists in that the condensation does not take place in the traditional manner through constant heating of the reaction mixture but that during the condensation process, upon reaching a basic viscosity of 4,000 to 8,000 mPas, preferably 5,000 to 7,500 mPas, the viscosity of the reaction mixture is reduced by adding water.

An explanation for the improvement of the properties as liquifiers for mineral binding agents achieved in this way has not been ascertained, but it is assumed that through the method of the invention the formation of high-molecular condensates is suppressed and the formation of condensates preferably is achieved which contain 2 to 4 naphthalene or alkyl-naphthalene nuclei and which surprisingly prove to be better liquifiers.

Starting products for the method of the invention are naphthalene or alkyl-naphthalene sulfonates of 1 to 6 alkyl carbons and formaldehyde or a precursor splitting off formaldehyde under the reaction conditions, which are condensed in a strongly acidic reaction media at a reaction temperature of 95° to 100° C. Naphthalene sulfonate or alkyl-naphthalene sulfonates are produced in a known manner through sulfonation of naphthalene or alkyl-naphthalene, particularly methyl or ethyl naphthalene or mixtures thereof or with naphthalene.

Sulfonation is preferably effected with concentrated sulfuric acid or with oleum, since then the reaction mixture from the sulfonation can be used directly for the further condensation with formaldehyde. For this condensation, additional acids are possibly added to the reaction mixture, preferably sulfuric acid, and slowly formaldehyde or a precursor capable of splitting off formaldehyde under the reaction conditions is added. Products of this nature are, for example, formaldehyde itself or its commercially available 30 to 50% aqueous solution (formalin) or substances which contain formaldehyde in chemically loosely bound form such as formaldehyde bisulfite, urotropine, trioxymethylene or paraformaldehyde. The quantity of formaldehyde used is in the range of 0.8 to 1.2 mol per mol of sulfoacidic products.

Following the addition of formaldehyde, the reaction mixture of the condensation reaction has a starting viscosity of 5 to 20 mPas (at 95° C.) which viscosity increases over the course of the condensation within from 16 to 19 hours to 4,000 to 8,000 mPas. At this viscosity, preferably at 5,000 to 7,500 mPas, the reduction of the viscosity starts during the further condensation. Reducing the viscosity of the reaction mixture can take place either discontinuously in the course of the condensation or continuously during the condensation reaction.

In the discontinuous reduction of the viscosity after reaching a basic viscosity of 4,000 to 8,000 mPas, preferably at a basic viscosity of 5,000 to 7,500 mPas, water is added in portions to the reaction mixture, with the condensation reaction being continued between the water additions which may take place at intervals of one half to several hours. During the continuation of the condensation reaction, the viscosity of the reaction mixture increases slightly and is suddenly reduced when the portions of water are added.

The method can be carried out under operationally favorable aspects if the naphthalene sulfonate or alkyl-naphthalene sulfonates are condensed with formaldehyde until the reaction mixture, which has a starting viscosity (at 95° C.) of 5 to 20 mPas reaches a viscosity of 4,000 to 8,000 mPas, preferably 5,000 to 7,500 mPas, whereupon the viscosity is reduced to 2,000 to 3,000 to mPas by adding water. Then, the condensation is carried out again to a viscosity of 3,200 to 3,900 mPas, whereupon the viscosity is again reduced to 1,100 to 1,500 mPas by adding water and again condensation is carried out until a viscosity of 1,600 to 2,200 mPas is reached. At this point, the condensation is ended through the addition of water and neutralization with an alkaline solution is effected with the amount of water being selected so that about a 35% solution of the alkali metal salt of a naphthalene or alkyl-naphthalene-formaldehyde condensation product is obtained.

Continuous reduction of the viscosity takes place by continuous addition of water to the reaction mixture as soon as a basic viscosity of 4,000 to 8,000 mPas, preferably 5,000 to 7,500 mPas is reached. The reaction temperature of 95° to 100° C. is maintained, i.e. the condensation reaction is not interrupted but is carried out continuously for 5 to 7 hours. The continuous water addition is therefore set so that the reaction mixture at the end of the condensation when the fraction of not-condensed naphthalene sulfonate or alkyl-naphthalene sulfonates is less than 2% to 3% of the original quantity, lies in the range of 1,600 to 2,200 mPas.

In the discontinuous mode, the reaction mixture is then neutralized with an alkaline solution (sodium or potassium hydroxide) and diluted with further additions of water to obtain about a 35% aqueous solution of the alkali metal salt of a naphthalene- or alkyl-naphthalene-sulfonate formaldehyde condensation product. This product is used unchanged in a manner known per se as a liquifier for mineral binding agents, particularly as a concrete liquifier.

In the following examples there are described several preferred embodiments to illustrate the invention. However, it is to be understood that the invention is not intended to be limited to the specific embodiments.

EXAMPLE 1

576 g of naphthalene in a three-neck flask equipped with a stirrer, a dripping funnel, a thermometer and a cooling means were reacted with 576 g of 96% sulfuric acid at 120° C. for one hour to sulfonate the naphthalene and then the mixture was stirred at 160° C. for three hours. After cooling the mixture to 120° C., 435 g of water were added followed by the addition of 230 g of 96% sulfuric acid. The mixture was cooled to 80° C. and 365 g of 37% formalin were added dropwise over 3 hours. The mixture was stirred at 95° C. for 18 hours at which time the viscosity reached 6,800 mPas and after 100 g of water were added, the mixture had a viscosity of 2,450 mPas. The mixture was stirred at 95° C. for another two hours after which the viscosity was 3,750 mPas. Another 100 g of water were added whereupon the viscosity fell to 1325 mPas. The mixture was stirred at 95° C. for another four hours after which the viscosity was 1,750 mPas and 1,164 g of water were then added to terminate the reaction. The resulting resin solution was neutralized with 1,160 g of 40% sodium hydroxide to a pH of 10.0 to obtain a 35% solution of the sodium salt of a naphthalene sulfonic acid-formaldehyde condensation product of the invention.

EXAMPLE 2-COMPARISON

The condensation product of DE-AS 1,238,831 was prepared as follows: 576 g of naphthalene were placed in a three-neck flask as in Example 1 and were reacted with 567 g of 96% sulfonic acid at 120° C. for one hour. The reaction mixture was stirred at 160° C. for three hours and after cooling to 120° C., 435 g of water were added followed by the addition of 230 g of 96% sulfuric acid. The mixture was cooled to 80° C. and 365 g of 37% formalin were added dropwise over 3 hours. The mixture was then heated to 95° to 100° C. over one hour and the mixture was reacted at the said temperature for 25 hours. Then, the solution was diluted with 1,314 g of water and was neutralized with 1,160 g of 40% sodium hydroxide to obtain a 35% solution of the sodium salt of a naphthalene sulfonic acid-formaldehyde condensation product.

EXAMPLE 3

The condensation products of Examples 1 and 2 were tested as liquifiers for cement using a mixture of 450 g of blast furnance slag cement HOZ 35L, 1,350 g of normal sand of DIN 1164 test, 4,5 g of the liquifier from Example 1 to 2 and sufficient water for the listed water/cement factors. A control experiment (0) without liquifier was also tested. The resulting cements were then tested for extent of spread by DIN 18,555 Section 9, for strength by DIN 1164 Section 7 and for setting by DIN 1164 part 5 and the results are reported in the following Table.

| | EXAMPLE 2 | EXAMPLE 1 | 0 Experiment |
|---|---|---|---|
| Water/Cement factor | 0.43 | 0.405 | 0.5 |
| Compression strength ($N/mm^2$) after | | | |
| 2 d | 17 | 30 | 14 |
| 7 d | 36 | 52 | 41 |
| 28 d | 48 | 62 | 46 |
| Bending strength ($N/mm^2$) after | | | |
| 2 d | 3.08 | 4.30 | 3.05 |
| 7 d | 4.86 | 6.25 | 4.84 |
| 28 d | 5.51 | 6.58 | 5.45 |
| Extent of spread (mm) | 243 | 262 | 130 |
| Water savings (%) | 14 | 18 | — |
| Begin of setting | 3 h 20 min | 3 h 25 min | 2 h 50 min |
| End of setting | 4 h 15 min | 4 h 20 min | 3 h 50 min |

It can be seen from the results of the Table that the cement of the invention possessed superior strength, better spreadability and a better saving of water.

Various modifications of the invention may be made without departing from the spirit or scope thereof and it is to be understood that the invention is intended to be limited only as defined in the appended claims.

What we claim is:

1. A process for the preparation of a liquifier for mineral binding agents comprising condensing by heating a member of the group consisting of naphthalene sulfonic acid and alkyl naphthalene sulfonic acids with formaldehyde or a formaldehyde precursor in highly acidic solution until a viscosity of 4,000 to 8,000 mPas is reached, adding water periodically to reduce the viscosity of the mixture until the condensation is complete and neutralizing the mixture to obtain a water-soluble condensation product.

2. The process of claim 1 wherein the viscosity is 5,000 to 7,500 mPas.

3. The process of claim 1 wherein the viscosity is reduced discontinuously over the condensation reaction.

4. The process of claim 1 wherein the viscosity is reduced continuously over the condensation reaction.

5. A process for the preparation of a liquifier for mineral binding agents comprising forming a mixture of naphthalene sulfonic acid or alkyl naphthalene sulfonic acid and formaldehyde or a formaldehyde precursor with a viscosity of 5 to 20 mPas, reacting the mixture with heating in highly acidic solution until the viscosity is 4,000 to 8,000 mPas, adding water to the mixture to reduce the viscosity to 2,000 to 3,000 mPas, reacting the mixture until the viscosity is 3,200 to 3,900 mPas, adding water to reduce the viscosity to 1,100 to 1,500 mPas, reacting the mixture until a viscosity of 1,600 to 2,200 mPas is reached, adding water to terminate the condensation and neutralizing the mixture with an alkali metal solution to obtain approximately a 35% of solution of the alkali metal salt of the condensation product.

6. The process of claim 5 wherein the viscosity is 5,000 to 7,500 mPas.

7. The process of claim 1 wherein the condensation is effected at 95° to 100° C. to obtain a viscosity of 4,000 to 8,000 mPas and the viscosity is reduced by continuous addition of water over 5 to 7 hours at 95° to 100° C. to obtain a final viscosity of 1,600 to 2,200 mPas which mixture is diluted with water and neutralzed to obtain a 35% solution of the alkali metal salt of the condensation product.

* * * * *